United States Patent
Harney et al.

(10) Patent No.: US 12,142,301 B1
(45) Date of Patent: Nov. 12, 2024

(54) SYSTEM, METHOD, AND COMPUTER PROGRAM FOR FACILITATING VIDEO GENERATION BY PREDICTING AND RECOMMENDING NEXT STEPS IN THE VIDEO GENERATION PROCESS

(71) Applicant: GoAnimate, Inc., San Mateo, CA (US)

(72) Inventors: Matthew Harney, Bangkok (TH); Tang Fei Yu, Hong Kong (CN)

(73) Assignee: GoAnimate, Inc., San Mateo, CA (US)

( * ) Notice: Subject to any disclaimer, the term of this patent is extended or adjusted under 35 U.S.C. 154(b) by 48 days.

(21) Appl. No.: 18/131,756

(22) Filed: Apr. 6, 2023

Related U.S. Application Data

(60) Provisional application No. 63/433,400, filed on Dec. 16, 2022.

(51) Int. Cl.
*G11B 27/036* (2006.01)
*G06N 3/08* (2023.01)

(52) U.S. Cl.
CPC ............ *G11B 27/036* (2013.01); *G06N 3/08* (2013.01)

(58) Field of Classification Search
CPC ................................ G11B 27/036; G06N 3/08
See application file for complete search history.

(56) References Cited

U.S. PATENT DOCUMENTS

| | | | |
|---|---|---|---|
| 9,805,378 B1* | 10/2017 | Wei | H04N 21/251 |
| 2019/0333513 A1* | 10/2019 | Cao | G06F 3/167 |
| 2021/0060404 A1* | 3/2021 | Wanke | G07C 1/22 |
| 2022/0150582 A1* | 5/2022 | Nishimura | H04N 21/4668 |

* cited by examiner

*Primary Examiner* — Thai Q Tran
*Assistant Examiner* — Jose M Mesa
(74) *Attorney, Agent, or Firm* — Lessani Law Group, PC

(57) ABSTRACT

This disclosure relates to a system, method, and computer program for facilitating video creation by recommending next steps in a user interface for video creation. A video production system tracks the state of a video as a user makes changes to the video. As the user develops the video, the system predicts the next step in the video generation process and makes recommendations to the user based on this prediction. The system will recommend an asset type to add to the video and also suggest specific instances of the asset type to add to the video. The video production system leverages a number of prediction models. The models include a deep learning model that is trained on a large corpus of video material to predict a next step of a video based on a current state. The system greatly shortens the time needed for the production of digital video by recommending video assets automatically to the user. As the underlying model has been trained on a corpus of high quality data, this system will lead the user to create high quality video with the correct conventions, whilst still allowing creative direction.

24 Claims, 5 Drawing Sheets

Example Prediction Model Architecture for Next Step Predictions

SYSTEM, METHOD, AND COMPUTER PROGRAM FOR FACILITATING VIDEO GENERATION BY PREDICTING AND RECOMMENDING NEXT STEPS IN THE VIDEO GENERATION PROCESS

RELATED APPLICATIONS

This application claims the benefit of U.S. Provisional Application No. 63/433,400 filed on Dec. 16, 2022, and titled "Prediction System for Facilitating Video Creation," the contents of which are incorporated by reference herein as if fully disclosed herein.

FIELD OF THE INVENTION

This invention relates generally to video generation and, more specifically, to facilitating video creation by predicting and recommending next steps in a video generation process.

BACKGROUND

Existing video production systems allow the user to add assets to a video by selecting from a library of assets. For example, in a video creation tool the software system could show a user many types of background images to pick from. However, the libraries of digital assets are getting so large that it becomes time consuming for the user to consider all assets in a presentation. The situation is made worse with the recent advancement in generative asset creation. In effect, a software system can show the user a near infinite amount of assets. Current solutions involve search, filters, and recommendations. Therefore, there is demand for a system that has a more intuitive understanding of the video generation process and guides the user through the process in a way that promotes both efficiency and high-quality video production based on a deep understanding of best practices in video development and how video assets relate to each other.

SUMMARY OF THE INVENTION

This disclosure relates to a system, method, and computer program for facilitating video creation by recommending next steps in the video generation process. A video production system tracks the state of a video as a user makes changes to the video. As the user develops the video, the system predicts the next step in the video generation process and makes recommendations to the user based on this prediction. The system will recommend an asset type to add to the video and also suggest specific instances of the asset type to add to the video.

The video production system leverages a number of prediction models. The models include a deep learning model that is trained on a large corpus of video material to predict a next step of a video based on a current state. The training material may also include video-related material, such as screenplays. There are also prediction models (which may include one or more deep learning models) for each type of asset that may be added to a video. The input to each of these models includes metadata related to the current state of the video. The metadata includes attributes of the assets in the current state of the video, as well as a time stamp associated with the current state of the video.

For each prediction model, there is a corresponding recommendation module that makes recommendations to the user based on the output of the prediction models. For example, a recommendation model may recommend the next step assigned the highest probability by the prediction model.

In addition to increasing video quality, the system greatly shortens the time needed for the production of digital video by recommending digital assets such as props, backgrounds, characters, and dialog automatically to the user. It can recommend these assets with one or more contexts such as time, position, and visual effects. The system is trained to infer not only which digital assets to recommend to the user, but when would be the best time and place to show them in the framing of digital video. The recommended assets may be obtained from an asset library or generated by the system using asset-generation machine learning modules.

In one embodiment, a method, performed by a computer system, for facilitating video creation by recommending next steps and assets to add to a video, comprises the following steps:

identifying a current state of a video being created in a video production workspace, including identifying assets in the video in the current state and a time in a video timeline associated with the current state;

predicting a next step in the generation of the video based on the current state of the video and the time in the video timeline of the current state of the video;

recommending one of a plurality of asset types to add to the video based on the predicted next step;

recommending one or more instances of the recommended asset type to add to the video based on the current state of the video;

receiving user input to add one of the instances of the recommended asset type to the video;

adding the selected instance of the recommended asset type to the video to create a new state of the video; and repeating the above steps one or more times.

DETAILED DESCRIPTION OF THE PREFERRED EMBODIMENTS

This disclosure relates to a system, method, and computer program for facilitating video creation by recommending next steps in a user interface for video generation. A video production system tracks the state of a video as a user makes changes to the video. As the user develops the video, the system predicts the next step in the video generation process based on the system's understanding of video conventions and makes recommendations to the user based on this prediction. The system will recommend an asset type to add to the video and also suggest specific instances of the asset type to add to the video. The method is performed by a computer system ("the system").

The system promotes both efficiency and quality in the video production process. The system helps a user navigate the near-infinite number of asset choices and recommends assets to add to videos at a particular time and location based on its deep understanding of best practices in video production and how assets relate to each other in a video. This understanding is achieved by training machine learning models on a corpus of high-quality videos, where during the training process the system discovers statistical patterns in the videos and the corresponding video production.

1. Definitions

An asset is an element of a video. An asset may be any number of multimedia types, such as audio, video, voice, images, animations, text. Assets also may include proprietary video asset types (as might be known to a video production software), such as characters, character actions, backgrounds, and props.

A scene is a virtual stage in a user interface of a video production software on which a user can arrange assets for a video. A video typically comprises a series of scenes.

A call-to-action is an icon, button, link, or other UI element in a user interface that enables a user to interact with the system to initiate an action by the system.

2. Example Software Architecture

Figure 1:
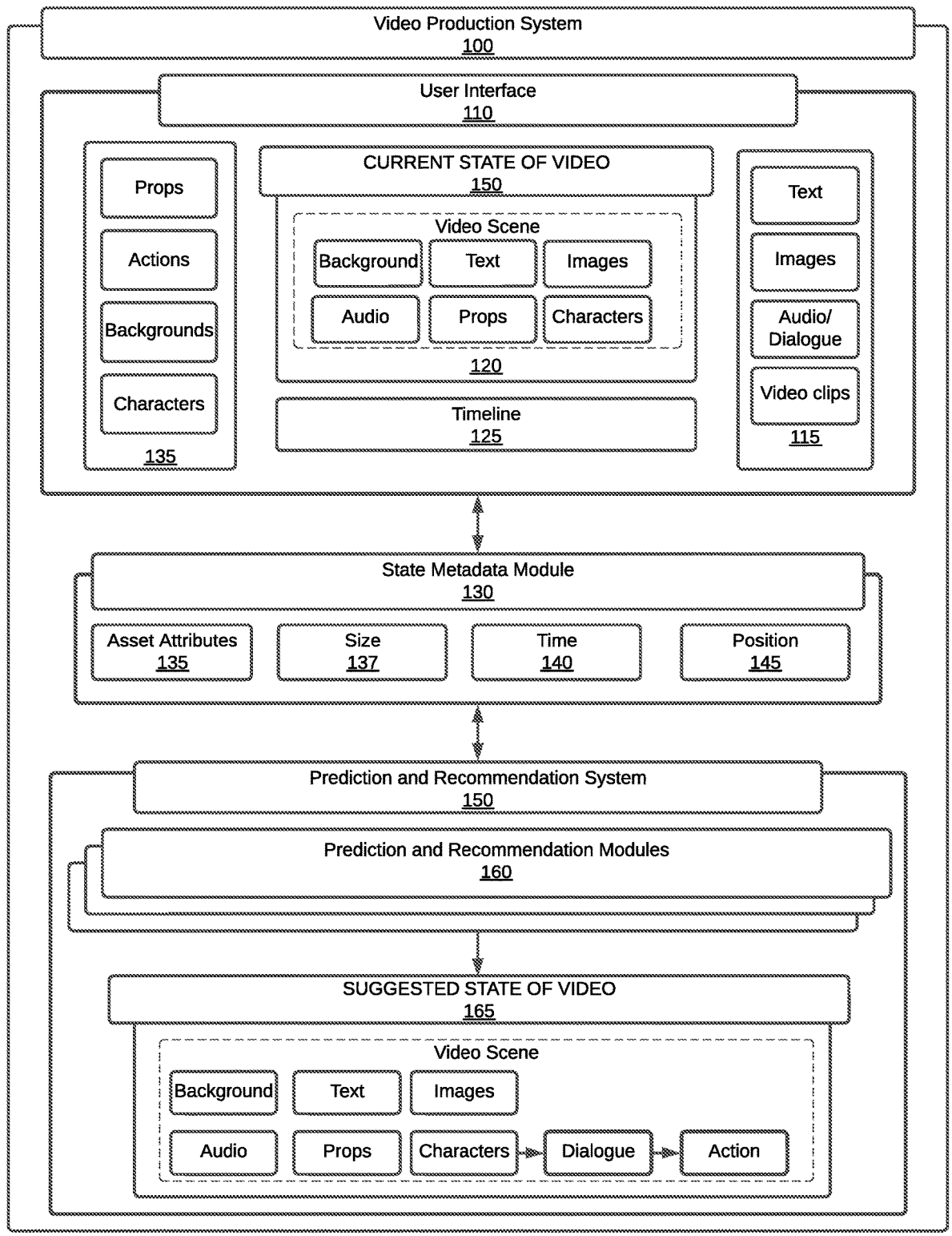
FIG. 1 is a block diagram that illustrates an example software architecture of a video production system according to one embodiment.

FIG. 1 illustrates an example architecture for the system. The system 100 includes a user interface module 110 that generates a video production workspace 120 in which a user can produce and edit videos. The workspace includes a timeline 125 that illustrates the order and time in which scenes in the video appear. A user adds assets to the workspace 120 to create scenes for the video. The type of assets that a user is able to add include both generic media forms 115, such as text, audio, images, animation, and video, and proprietary video asset types 135, such as characters, character actions, backgrounds, and props.

The system includes a module 130 that identifies metadata associated with a current state 150 of the video. The metadata include information about the assets in the current state of the video and the time 140 in the video timeline 125 of the current state of the video. In one embodiment, the information about the assets in the current state includes their size 137 and position 145 in the video, as well as other attributes 135, such as metadata tags that describe the assets. For example, a cartoon character for a man at beach may be associated with the following metadata tags: "character," "cartoon", "2D", "man "beach," "summer," and "travel." The assets for which metadata is obtained may be all the assets in the video from the start to the current state or just the assets in the scene currently displayed in the video production workspace 120. The metadata may also describe the video generation steps that the user has taken to reach the current step. This may include the tools used by the user.

The system includes a Prediction and Recommendation Platform 150 with a library of prediction models and corresponding recommendation modules 160. The metadata associated with current state is inputted into the platform 150. The output of the platform is a predicted next step in the video production, as well as recommendations for assets to add to the video in accordance with the recommended next step. For example, in FIG. 1, the current state 150 of the video includes a character, and the prediction system recommends a suggested state 165. Specifically, the system recommends that the user add dialog and action related to the character. The system then provides suggested dialogs and actions from which the user can select. The systems recommendations are displayed to the user in the user interface 110.

Figure 2:
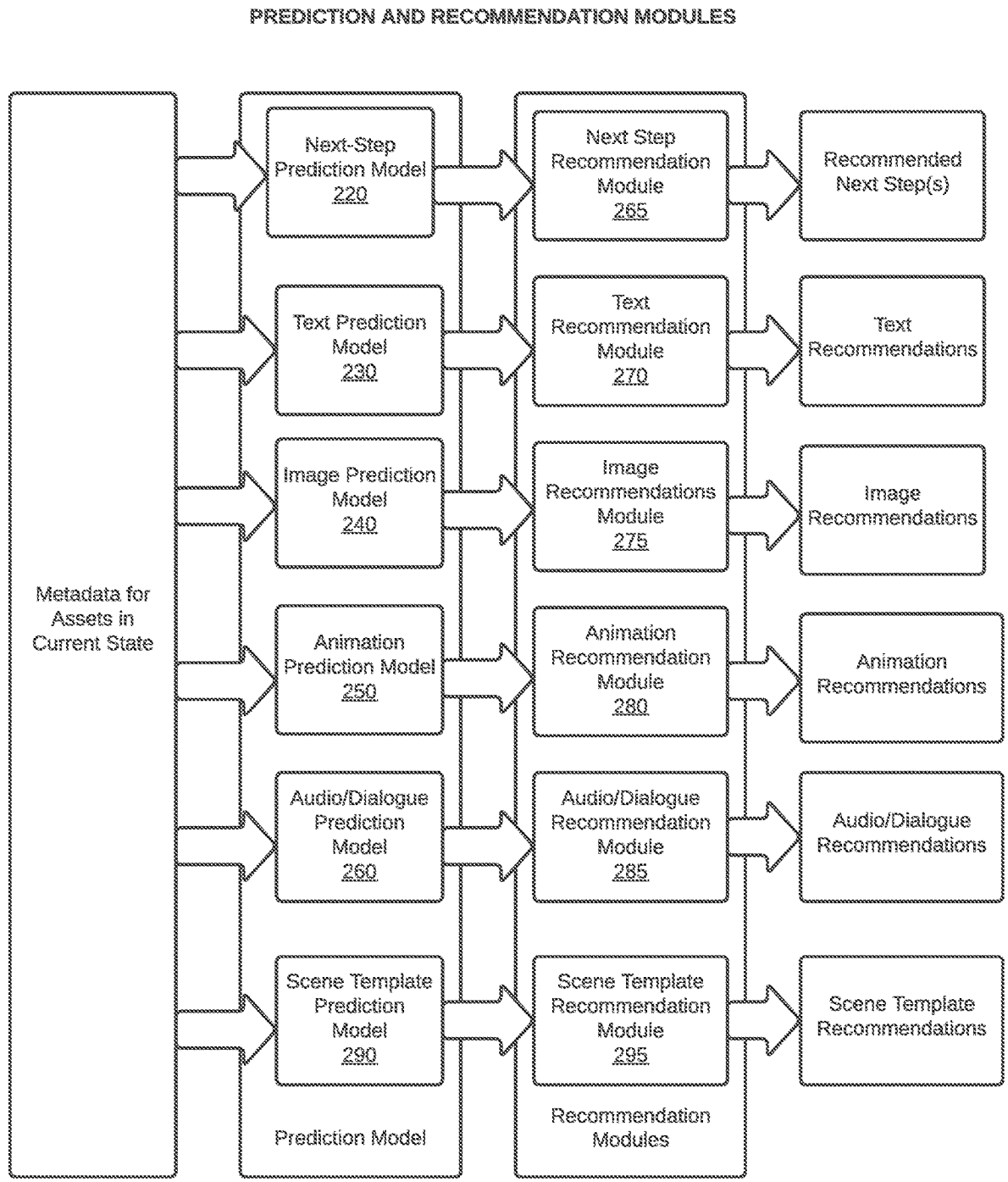
FIG. 2 is a block diagram that illustrates prediction and recommendation modules according to one embodiment.

FIG. 2 illustrates the prediction and recommendation modules in more detail. The prediction and recommendation modules 160 include a next-step prediction model 220. The next-step prediction model 220 is a neural network model trained to predict a next step in the video production process. The next-step prediction model 220 is trained on a large volume of video where the assets of the video are labeled with metadata tags, size, position, and time data. In this way, the model learns how a video, and the assets within it, progress from one state to another. In training, it also learns how various assets and asset types interact with each (e.g., characters interact with a dialog track, and characters interact with other characters, characters interact with props in the video, etc.). The next-step prediction model 220 is able to take a current state of the video and predict what should happen next in the video to converge the video closer to statistical patterns found during training. This prediction is then used by the next-step recommendation module 265 to recommend a next step for video production. The recommended next step is to add one or more assets that would result in the video having the predicted next step. The system views a video state that is consistent with patterns seen in training as "higher quality" and thus adding the recommended asset(s) is viewed by the system as improving the quality of the video at the current state.

The prediction and recommendation modules 160 also include a prediction model for each a plurality of asset types, such as text, images, audio/dialog, video clips, props, actions, backgrounds, and characters (e.g., modules 230, 240, 250, 260, and 290 in FIG. 2). Each of these models is trained or configured to predict instances of an asset type based on metadata for a state of a video. The prediction models may be neural network models, Markov models, or algorithmic models. For example, the system may track the interactions between users and assets in videos, assets with other assets in videos, and assets with other asset as defined by system data (e.g., assets with a common tag in the system), and a Markov model may be used to predict which assets are most likely to appear in a video after the current state based on these tracked interactions.

For each prediction model, there is a corresponding recommendation module (e.g., modules 270, 275, 280, 285, and 295) that recommend assets to the user based on the output of the prediction model. For example, for each asset type, the recommendation module for the asset type may recommend the top n asset predictions from the corresponding prediction model. One or more call-to-actions in the user interface enables a user to view the recommendations and add one or more recommended assets to the user interface. The prediction and recommendation modules are not limited to the types displayed in FIG. 2.

The prediction and recommendation modules may rely on a library of assets, as well as dynamically-generated assets from machine-learning modules, to make predictions and asset recommendations. An example of an asset-generation module is a machine learning module with a neural network that is trained to generate assets based on input metadata that described the desired attributes of the output asset.

Figure 4:
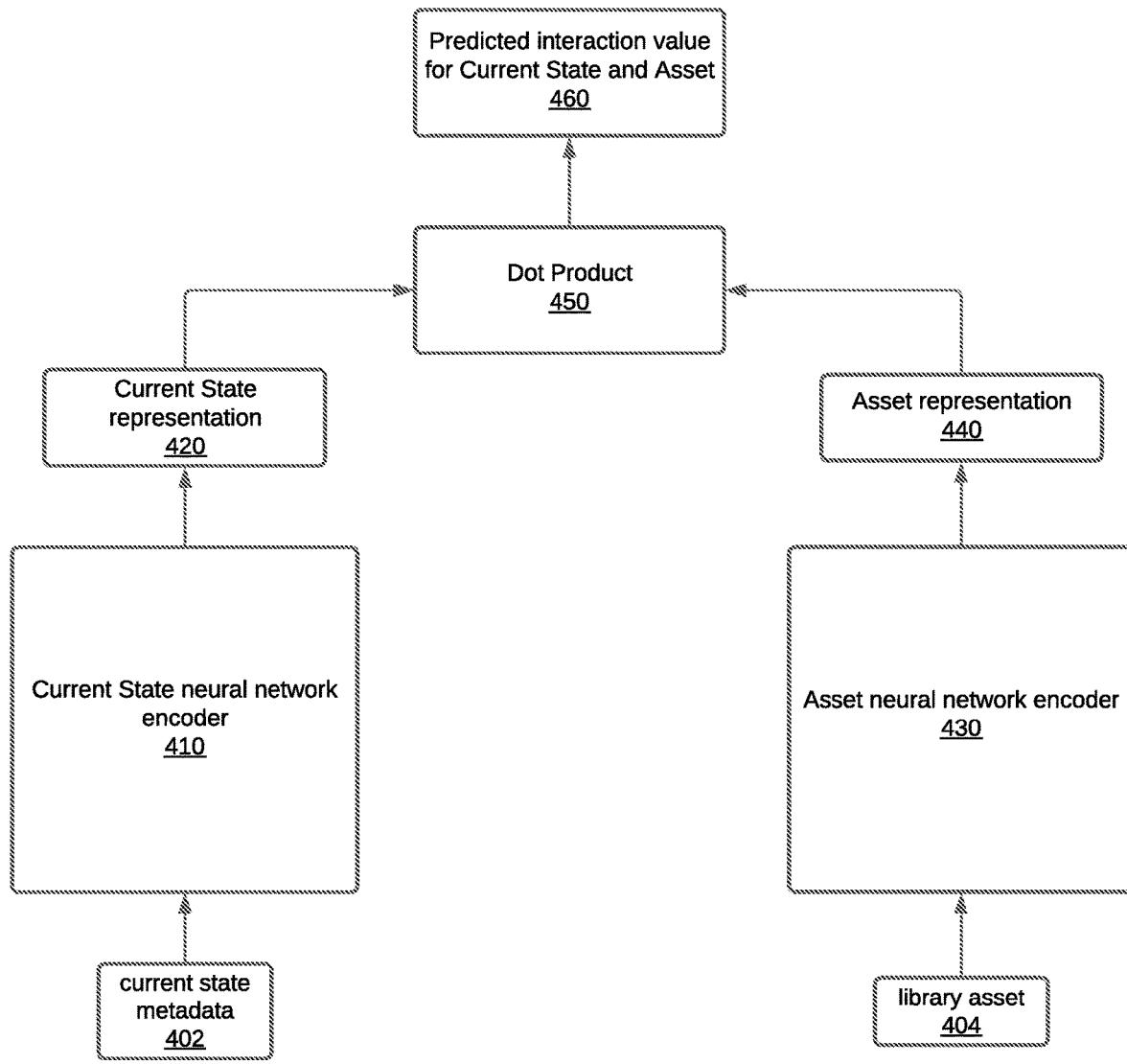
FIG. 4 is a block diagram that illustrates an example architecture of a prediction model for assets.

In one embodiment, a prediction model for an asset type makes predictions for instances of the asset type by calculating interaction values between assets in the current video and assets in an asset library for the subject asset type. For example, in order to make prop recommendations, the prediction model for props may calculate an interaction value between the current state of the video and assets in a prop library. FIG. 4 illustrates a prediction model architecture. Metadata 402 associated with the current state is inputted into a first neural network encoder 410 (e.g., a multi-layer perceptron network) which generates a vector representation 420 of the current state. Likewise, metadata associated with an asset 404 in an asset library is inputted into a second neural network encoder 430 (e.g., a multi-layer perceptron network), which generates a vector representation 440 of the asset. The dot product 450 is taken of the two vector representations, resulting in a predicted interaction value between the current state and the asset in the library. In other embodiments, the predicted interaction value is obtained by taking the cosine similarity of the current state representation and the asset representation or by concatenating the representations and applying a neural network to the concatenated representations. When the system recommends instances of an asset type to add to the video, the system first recommends assets having the highest interaction values with the current state. Training the model comprises learning the parameters of the neural network encoders that provide the most accurate predictions. In an alternate embodiment, both metadata for an asset 404 and metadata for the current state are inputted into the second neural network encoder 430, which generates a vector representation of the current state with the new asset. The dot product of the two vector representations results in an interaction value between the current state and the current state with the new asset.

A prediction model for an asset type may also predict attributes of an asset type to add to the video based on the current state. Specifically, the model predicts interaction values between the current state and a combination of asset attributes. The combinations of attributes with the highest interaction values with the current state may then be inputted into a machine-learning asset generation module that is trained to generate assets of a certain asset type having the input attributes. The generated assets are then recommended to the user.

Figure 5:
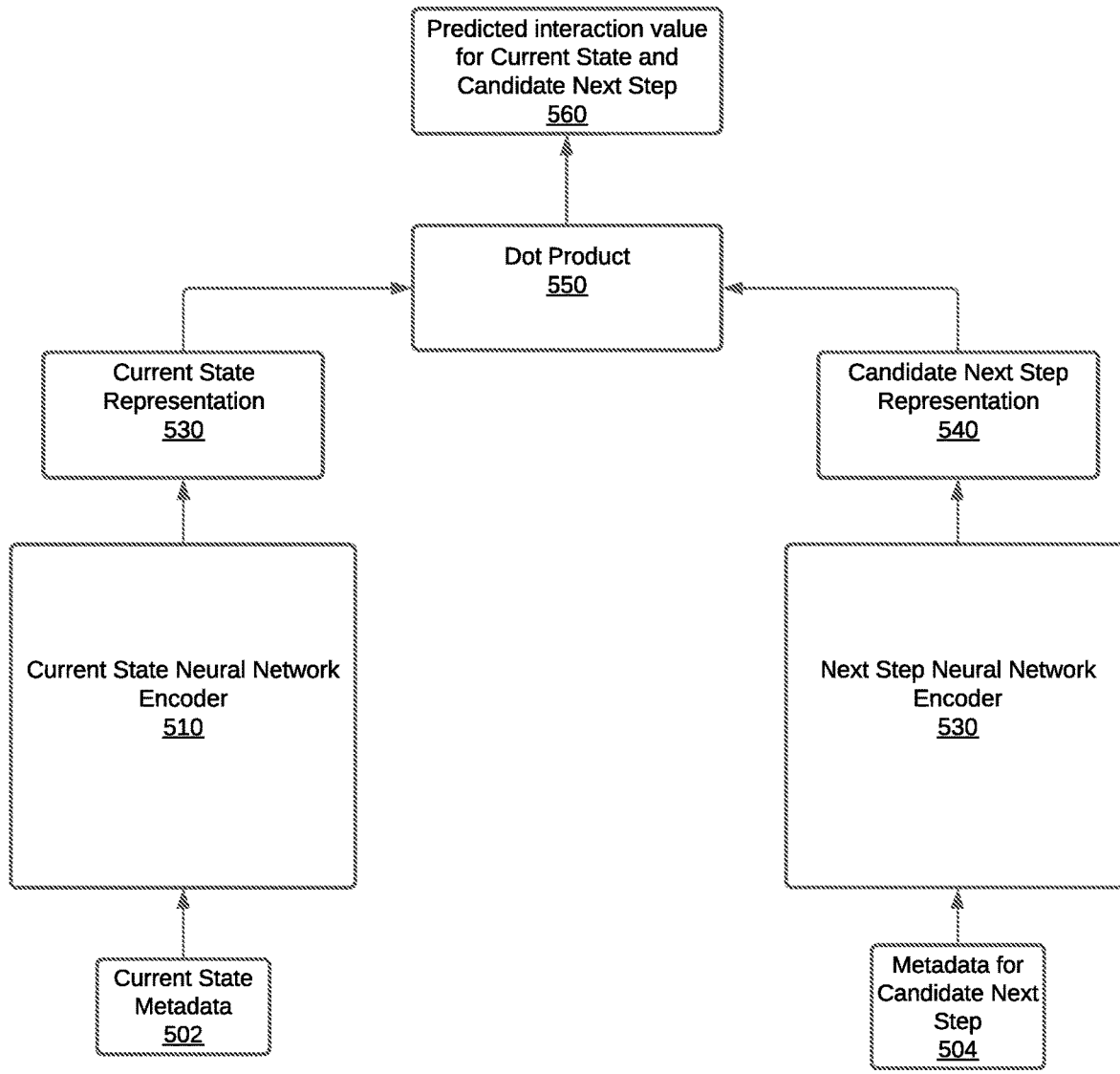
FIG. 5 is a block diagram that illustrates an example architecture of a prediction model for next steps in a video generation process.

As shown in FIG. 5, the same architecture as described with respect to FIG. 4 may be used for the next-step model 220 in order to calculate interaction values between a current state and each of a set of candidate next steps. Metadata 502 associated with the current state is inputted into a first neural network encoder 510 which generates a vector representation 520 of the current state. Likewise, metadata associated with a candidate next step 504 in a set of candidate next steps is inputted into a second neural network encoder 530, which generates a vector representation 540 of the candidate next step. The dot product 450 is taken of the two vector representations, resulting in a predicted interaction value between the current state and the candidate next step. In other embodiments, the predicted interaction value is obtained by taking the cosine similarity of the current state representation and the asset representation or by concatenating the representations and applying a neural network to the concatenated representations.

In certain embodiments, the user interface for the video production system is generated on client computers, and the Prediction and Recommendation Platform 150 runs on a backend server. The client computers send asset enhancement requests to the Prediction and Recommendation Platform via an API over the Internet or other network. Also, some of the prediction and recommendation modules in the Prediction and Recommendation Platform 150 may run locally on a client computer, and others may run on the backend server.

Data may be transferred between client computers and the backend server using JSON format. For the example, the metadata for an asset could be expressed in JSON format as follows:

{"tags": "character," "cartoon", "2D", "man "beach,"
   "summer," and "travel",
"size": 3.2
"position": (4.12, 2.36)
"id": "1",
"data": "<encoded>"}

The "id" corresponds to a unique ID for each asset in the video production workspace.

Figure 3:
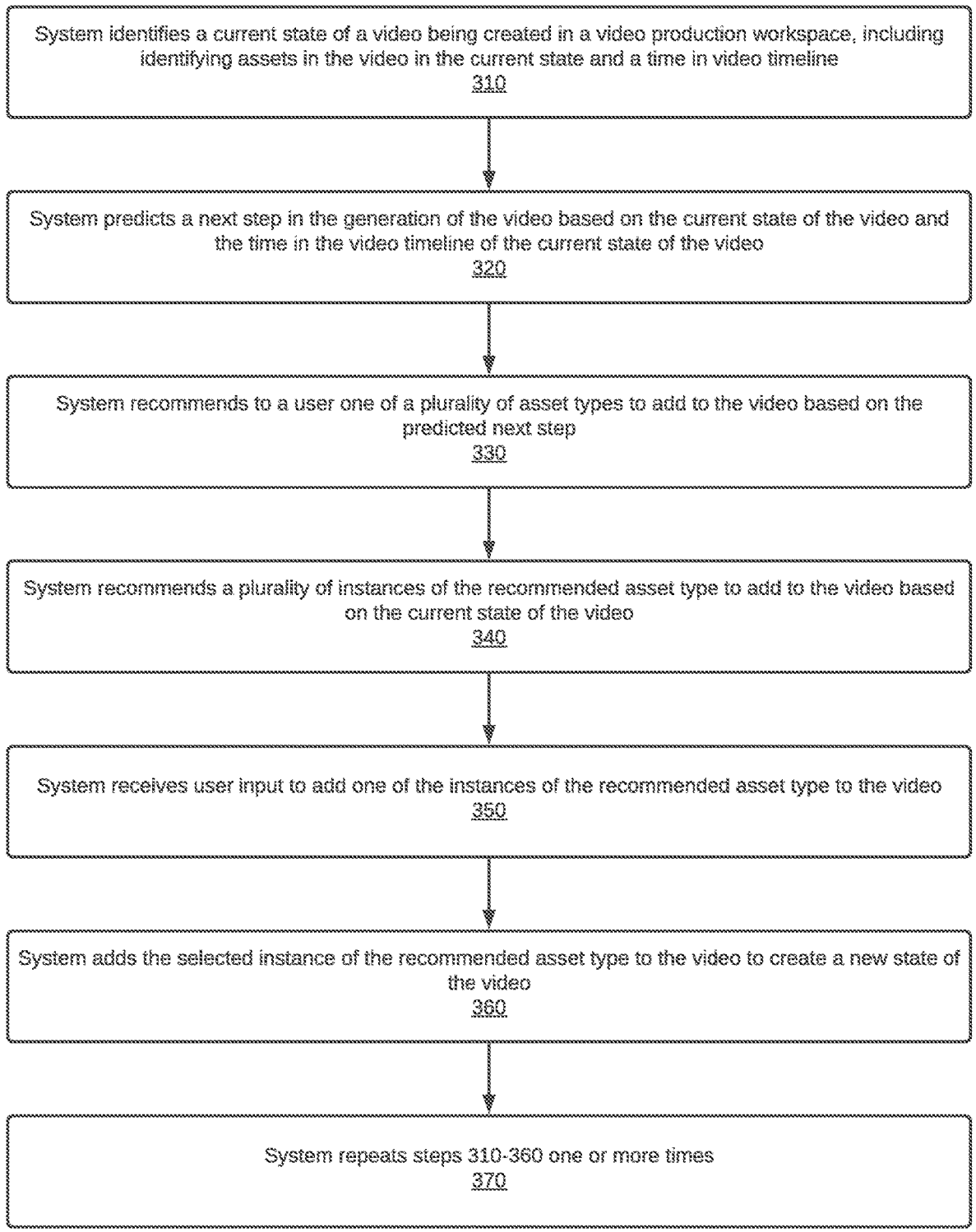
FIG. 3 is a flowchart that illustrates a method, according to one embodiment, for facilitating video generation by predicting next steps and recommending assets.

3. Method for Facilitating Video Generation by Predicting Next Steps and Recommending Assets FIG. 3 illustrates a method for facilitating video generation by predicting next steps and recommending assets.

The system identifies a current state of a video being created in a video production workspace (step 310). This includes identifying the assets in the video in the current state and a time in the video timeline. In one embodiment, the system initiates this step after a user has added one or more assets to the video production workspace.

The system obtains metadata associated with the current state of the video (step 315). The metadata include information about the assets in the current state of the video and a time in a video timeline associated with the current state of the video.

The system then predicts a next step in the generation of the video based on the current state of the video and the time in the video timeline of the current state of the video (step 320). As discussed above, metadata associated with the current state of the video is inputted into a next-step prediction module to obtain a next-step prediction.

The system recommends to a user one or more asset types to add to the video based on the predicted next step (step 330). For example, if the system predicts that the next step in the video is for a character in the video to perform an action, the system may suggest that a user animate a character by adding an action for the character. There are a number of ways the suggestion can be presented to the user in the user interface. For instance, certain buttons associated with the recommended asset type may be highlighted, or a window may pop up with the recommendation. The recommendation may be specific to a particular position or size for the recommended asset.

For each recommended asset type, the system recommends a plurality of instances of the recommended asset type to add to the video based on the current state of the video (step 340). For example, if the system recommends that the user animate a character by adding an action for the character, the system may provide a call-to-action in the user interface to add an action. In response to the user selecting the call-to-action, the system provides the user with a plurality of recommended actions for the character in the video. The recommendations increase the productivity of video producers by guiding them through the conventions of video generation.

In certain embodiments, the system may recognize which asset a user is manipulating in the video production workspace and make next-step predictions and recommendations with respect to the asset being manipulated.

In response to the system receiving a user's selection of one of the recommended instances of the asset type, the system adds the selected instance to the video to create a new state of the video (steps 350, 360). Steps 310-360 are repeated a plurality of times until the user indicates that the video is finished.

In one embodiment, a user's ability to see recommended instances of asset types is not limited to the next steps recommended by the system. The user can select any asset type in the user interface and see recommendations for instances of that asset type based on the current state of the video. For example, a user can select a call-to-action for "props" and see recommendations for props to add to the video based on the current state of the video, even if adding a prop is not the recommended next step.

4. Training the Machine Learning Asset Enhancement Modules

The prediction models may be trained using deep learning, auto encoders, transformers, and other machine learning techniques. In one embodiment, the modules use transformer architectures trained on phrase-image pairs and hence both an image and text can be passed into the models as parameters.

The modules are trained on a corpus of video. The training videos are labeled with asset metadata, asset size, and time information. The training videos may also be labeled with additional information, such as the type of video, tools used to create the video, and detailed system-level events about the steps taken by a user to create the video, such as closed-captioning, sound effects, edit timings, and other system-level data.

5.0 General

The methods described with respect to FIGS. 1-5 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for facilitating video creation by recommending next steps in a video generation process, the method comprising:
    identifying a current state of a video being created in a video production workspace, including identifying assets in the video in the current state and a time in a video timeline associated with the current state;
    predicting a next step in the generation of the video based on the current state of the video and the time in the video timeline of the current state of the video;
    recommending one of a plurality of asset types to add to the video based on the predicted next step;
    recommending a plurality of instances of the recommended asset type to add to the video based on the current state of the video;
    receiving user input to add one of the instances of the recommended asset type to the video;
    adding the selected instance of the recommended asset type to the video to create a new state of the video; and
    repeating the above steps one or more times.

2. The method of claim 1, wherein identifying a current state of the video include
    identifying a size and a position of each asset in the video.

3. The method of claim 1, wherein predicting a next step includes the following:
    obtaining metadata for the assets in the current state of the video;
    inputting the metadata to a prediction model; and
    receiving a predicted next step from the prediction model.

4. The method of claim 3, wherein the asset metadata includes a plurality of asset tags associated with each asset in the current state, a position of each asset within a scene in the current state, and the time in the timeline associated with the current state.

5. The method of claim 3, wherein the prediction model is a neural network trained using a training set of videos comprising videos labeled with asset metadata and time information.

6. The method of claim 1, wherein the plurality of asset types includes both generic media forms such as text, voice, other audio, images, animation and video, and proprietary video asset types such as characters, character actions, backgrounds, and props.

7. The method of claim 1, wherein the recommended plurality of instances are obtained from an asset library.

8. The method of claim 1, wherein the recommended plurality of instances are generated by the system using machine-learning asset-generation modules.

9. A system for facilitating video creation by recommending next steps in a video creation process, the system comprising:
    one or more processors;
    one or more memory units coupled to the one or more processors, wherein the one or more memory units store instructions that, when executed by the one or more processors, cause the system to perform the operations of:
        identifying a current state of a video being created in a video production workspace, including identifying assets in the video in the current state and a time in a video timeline associated with the current state;
        predicting a next step in the generation of the video based on the current state of the video and the time in the video timeline of the current state of the video;
        recommending one of a plurality of asset types to add to the video based on the predicted next step;
        recommending a plurality of instances of the recommended asset type to add to the video based on the current state of the video;
        receiving user input to add one of the instances of the recommended asset type to the video;
        adding the selected instance of the recommended asset type to the video to create a new state of the video; and
        repeating the above steps one or more times.

10. The system of claim 9, wherein identifying a current state of the video include identifying a size and a position of each asset in the video.

11. The system of claim 9, wherein predicting a next step includes the following:
    obtaining metadata for the assets in the current state of the video;
    inputting the metadata to a prediction model; and
    receiving a predicted next step from the prediction model.

12. The system of claim 11, wherein the asset metadata includes a plurality of asset tags associated with each asset in the current state, a position of each asset within a scene in the current state, and the time in the timeline associated with the current state.

13. The system of claim 11, wherein the prediction model is a neural network trained using a training set of videos comprising videos labeled with asset metadata and time information.

14. The system of claim 9, wherein the plurality of asset types includes both generic media forms such as text, voice, other audio, images, animation and video, and proprietary video asset types such as characters, character actions, backgrounds, and props.

15. The system of claim 9, wherein the recommended plurality of instances are obtained from an asset library.

16. The system of claim 9, wherein the recommended plurality of instances are generated by the system using machine-learning asset-generation modules.

17. A non-transitory computer-readable medium comprising a computer program that, when executed by a computer system, enables the computer system to perform the following method for facilitating video creation by recommending next steps in a video generation process, the method comprising:
    identifying a current state of a video being created in a video production workspace, including identifying assets in the video in the current state and a time in a video timeline associated with the current state;
    predicting a next step in the generation of the video based on the current state of the video and the time in the video timeline of the current state of the video;
    recommending one of a plurality of asset types to add to the video based on the predicted next step;
    recommending a plurality of instances of the recommended asset type to add to the video based on the current state of the video;
    receiving user input to add one of the instances of the recommended asset type to the video;
    adding the selected instance of the recommended asset type to the video to create a new state of the video; and
    repeating the above steps one or more times.

18. The non-transitory computer-readable medium of claim 17, wherein identifying a current state of the video include identifying a size and a position of each asset in the video.

19. The non-transitory computer-readable medium of claim 17, wherein predicting a next step includes the following:
    obtaining metadata for the assets in the current state of the video;
    inputting the metadata to a prediction model; and
    receiving a predicted next step from the prediction model.

20. The non-transitory computer-readable medium of claim 19, wherein the asset metadata includes a plurality of asset tags associated with each asset in the current state, a position of each asset within a scene in the current state, and the time in the timeline associated with the current state.

21. The non-transitory computer-readable medium of claim 20, wherein the prediction model is a neural network trained using a training set of videos comprising videos labeled with asset metadata and time information.

22. The non-transitory computer-readable medium of claim 17, wherein the plurality of asset types includes both generic media forms such as text, voice, other audio, images, animation and video, and proprietary video asset types such as characters, character actions, backgrounds, and props.

23. The non-transitory computer-readable medium of claim 17, wherein the recommended plurality of instances are obtained from an asset library.

24. The non-transitory computer-readable medium of claim 17, wherein the recommended plurality of instances are generated by the system using machine-learning asset-generation modules.

* * * * *